(12) United States Patent
Potier

(10) Patent No.: US 11,821,443 B2
(45) Date of Patent: Nov. 21, 2023

(54) ACTUATOR OVERPRESSURISING ASSEMBLY

(71) Applicant: Goodrich Actuation Systems SAS, Saint Ouen l'Aumone (FR)

(72) Inventor: Karl Potier, Aix en provence (FR)

(73) Assignee: GOODRICH ACTUATION SYSTEMS SAS, Saint Ouen l'Aumone (FR)

(*) Notice: Subject to any disclaimer, the term of this patent is extended or adjusted under 35 U.S.C. 154(b) by 39 days.

(21) Appl. No.: 17/541,410

(22) Filed: Dec. 3, 2021

(65) Prior Publication Data
US 2022/0194559 A1 Jun. 23, 2022

(30) Foreign Application Priority Data
Dec. 22, 2020 (EP) .................................. 20306656

(51) Int. Cl.
*F15B 11/032* (2006.01)
*F15B 3/00* (2006.01)
(Continued)

(52) U.S. Cl.
CPC ............ *F15B 11/032* (2013.01); *B64C 13/40* (2013.01); *F15B 3/00* (2013.01); *F15B 13/0402* (2013.01);
(Continued)

(58) Field of Classification Search
CPC ... Y10T 137/86831; B64C 13/40; F15B 3/00; F15B 13/0402; F15B 11/032;
(Continued)

(56) References Cited

U.S. PATENT DOCUMENTS 2,800,110 A * 7/1957 Haarmeyer ........... B30B 15/161
91/452
3,385,217 A * 5/1968 Bles ......................... F15B 3/00
137/99
(Continued)

FOREIGN PATENT DOCUMENTS

| DE | 102012003181 A1 | 8/2013 |
| KR | 20050011223 A | 1/2005 |
| WO | 2011064344 A1 | 6/2011 |

OTHER PUBLICATIONS

European Search Report for Application No. 20306656.8, dated May 19, 2021, 7 pages.

*Primary Examiner* — William M McCalister
(74) *Attorney, Agent, or Firm* — CANTOR COLBURN LLP

(57) ABSTRACT

An actuator pressure intensifying assembly includes a mode valve and a gear motor assembly, the mode valve arranged to receive, at an input port, a supply pressure and to provide, at an output port, a control pressure to an actuator, the mode valve further configured to move, in response to the supply pressure exceeding a predetermined activation threshold, from a first mode in which the supply pressure flows directly from the input port to the output port in a first fluid flow path, and a second mode in which the supply pressure flows from the input port to the output port in a second fluid flow path which includes the gear motor assembly between the input port and the output port which intensifies the supply pressure such that the control pressure is higher than the supply pressure.

7 Claims, 2 Drawing Sheets

(51) Int. Cl.
*F15B 13/04* (2006.01)
*B64C 13/40* (2006.01)

(52) U.S. Cl.
CPC ... *F15B 11/0325* (2013.01); *F15B 2211/2053* (2013.01); *F15B 2211/214* (2013.01); *F15B 2211/30565* (2013.01); *F15B 2211/526* (2013.01); *F15B 2211/528* (2013.01)

(58) Field of Classification Search
CPC .......... F15B 11/0325; F15B 2211/2053; F15B 2211/526; F15B 2211/528; F15B 2211/214; F15B 2211/30565
USPC ..................................................... 137/625.42
See application file for complete search history.

(56) References Cited

U.S. PATENT DOCUMENTS

| | | | |
|---|---|---|---|
| 4,077,746 A | 3/1978 | Reynolds | |
| 4,631,000 A | 12/1986 | Burandt | |
| 4,631,100 A | 12/1986 | Pellegrino | |
| 4,836,088 A * | 6/1989 | Seabaugh | F15B 11/024 91/530 |
| 4,913,616 A * | 4/1990 | Dunn | E02F 9/2217 414/697 |
| 5,061,175 A * | 10/1991 | Iwamoto | B29C 45/67 425/593 |
| 5,415,076 A * | 5/1995 | Krone | F15B 11/044 91/440 |
| 5,419,236 A * | 5/1995 | Plettner | H01H 33/34 91/416 |
| 5,542,180 A * | 8/1996 | Karani | E04G 23/08 30/228 |
| 5,996,465 A * | 12/1999 | Morikawa | E02F 3/965 91/458 |
| 7,040,214 B2 * | 5/2006 | Cossette | E02F 3/965 91/420 |
| 7,540,231 B2 * | 6/2009 | Hofmann | F15B 11/024 91/436 |
| 8,596,575 B2 | 12/2013 | Ito et al. | |
| 9,162,297 B2 * | 10/2015 | Luyendijk | F15B 15/14 |
| 9,849,926 B2 | 12/2017 | Saunders et al. | |
| 10,798,866 B2 * | 10/2020 | Stovall | A01B 63/008 |
| 2022/0194559 A1 * | 6/2022 | Potier | B64C 13/40 |

* cited by examiner

ACTUATOR OVERPRESSURISING ASSEMBLY

CROSS-REFERENCE TO RELATED APPLICATIONS

This application claims priority to European Patent Application No. 20306656.8 filed Dec. 22, 2020, the entire contents of which is incorporated herein by reference.

TECHNICAL FIELD

The present disclosure relates to the field of hydraulic actuators such as, but not exclusively, actuators used in aircraft.

BACKGROUND

Actuators are used in many applications where a load such as a component or surface is to be moved. Many fields utilise hydraulic actuators that operate due to pressure differences to cause movement of an actuator rod or piston that causes corresponding movement of the load.

Many aircraft or other vehicles or machines have control surfaces such as flaps, or other moveable parts, that are moved and positioned by hydraulic actuators. For high loads the actuator, to provide the necessary force, will need to be fairly large and/or have a high supply pressure. Larger actuators or greater supply pressures can be undesirable where space or weight concerns are paramount such as in aircraft.

Systems have been developed to boost or intensify the pressure from the normal system pressure supply, as described, for example, in U.S. Pat. No. 4,631,100. The known solutions, however, have limitations in terms of safety, leakage, the required operating speed of components being high and/or the need for additional power sources.

There is, therefore, a need for an improved actuator assembly that is able to provide a high output force without the need to increase the system supply and/or the overall size and weight of the actuator itself.

SUMMARY

According to one aspect of the present disclosure there is provided an actuator pressure intensifying assembly comprising a mode valve and a gear motor assembly, the mode valve arranged to receive, at an input port, a supply pressure and to provide, at an output port, a control pressure to an actuator, the mode valve further configured to move, in response to the supply pressure exceeding a predetermined activation threshold, from a first mode in which the supply pressure flows directly from the input port to the output port in a first fluid flow path, and a second mode in which the supply pressure flows from the input port to the output port in a second fluid flow path which includes the gear motor assembly between the input port and the output port which intensifies the supply pressure such that the control pressure is higher than the supply pressure.

The mode valve preferably comprises a valve body and a spool arranged for axial movement within the valve body, the valve body defining the input port and the output port and further defining second mode outlet ports, and wherein the mode valve is arranged such that in the first mode, the spool is arranged to provide a flow path between the input port and the output port and to block the second mode output ports, and in the second mode, to provide a flow path from the input port to a second mode output port connected to the gear motor assembly and to block the output port.

The gear motor assembly preferably comprises a gear motor and a gear pump connected via a torque shaft, the gear motor and the gear pump arranged such that in the second mode, the supply pressure flows through the mode valve to the gear motor to cause the motor to rotate, and wherein torque from rotation of the motor is transmitted to the gear pump to provide increased pressure that is returned to the mode valve and provided to the actuator.

In an example, a spring is provided at each end of the spool, the springs selected such that in the first mode, the spool body is positioned, by the springs, to create the flow path between the input port and the output port, and when a pressure applied at the input port exceeds a threshold pressure, the spool body is moved against the force of the springs to create the flow path from the input port to the second mode output port.

The valve is arranged to change from the first mode to the second mode in response to the supply pressure exceeding a predetermined threshold pressure e.g. 2500 psi (17236.9 kPa).

According to another aspect of the disclosure, there is provided an actuator assembly comprising an electrohydraulic servovalve, EHSV, to provide a supply pressure, and actuator to receive a control pressure and an actuator pressure intensifying assembly as defined above between the EHSV and the actuator. An EHSV mode valve may be provided between the EHSV and the mode valve.

According to another aspect, there is provided a method of intensifying a supply pressure to provide an increased control pressure to an actuator, the method comprising, in response to the supply pressure exceeding a predetermined threshold pressure, providing the supply pressure to a gear motor assembly whereby torque generated by the gear motor assembly increase the pressure of the supply pressure to provide the increased control pressure.

In one application, the actuator is for moving an aircraft part such as a flap.

BRIEF DESCRIPTION OF THE DRAWINGS

Preferred embodiments will be described, by way of example only, with reference to the accompanying drawings.

DETAILED DESCRIPTION

Figure 1:
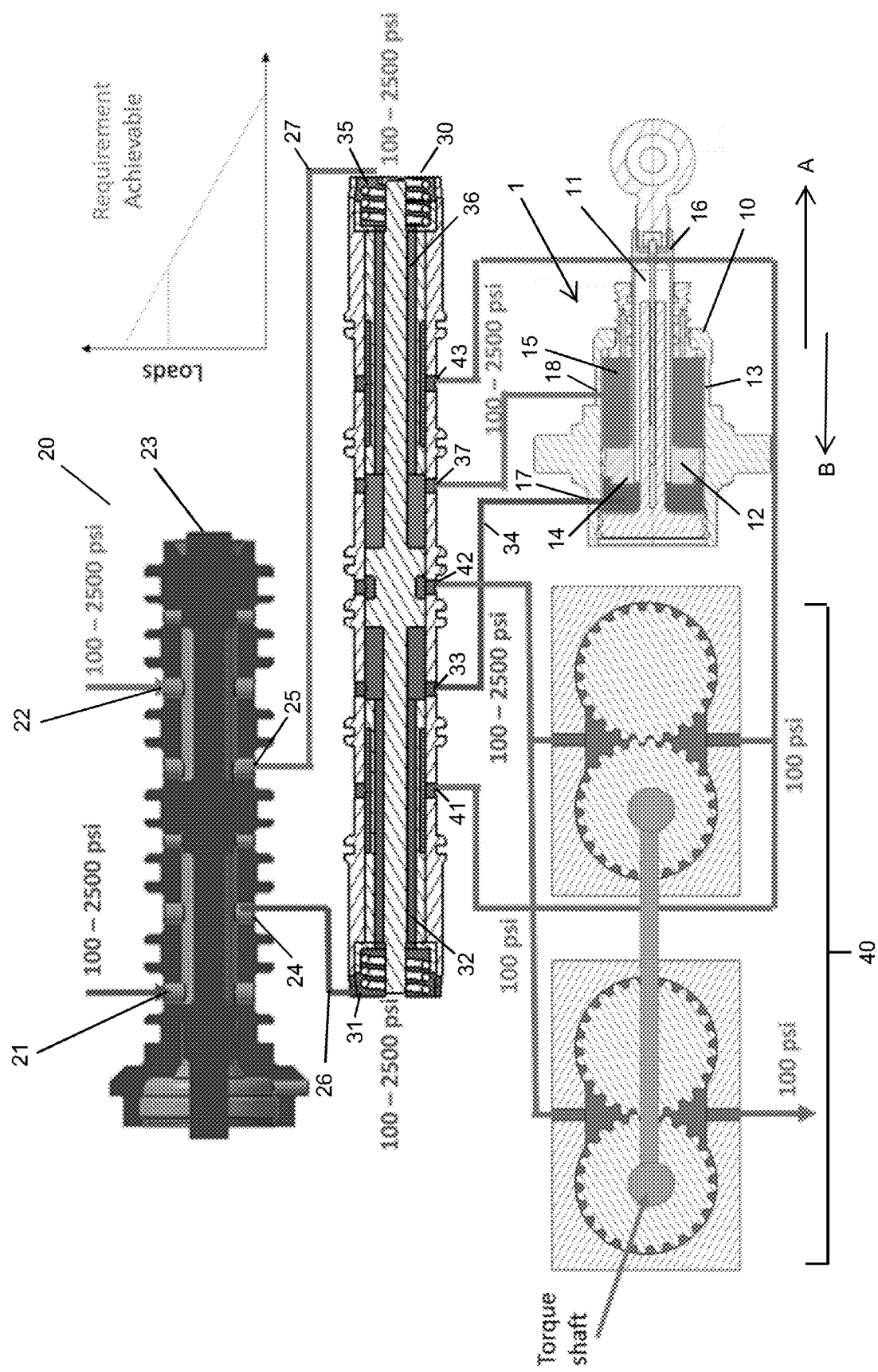
FIG. 1 is a schematic view of an assembly according to the present disclosure in a normal pressure operating mode.

As mentioned above, there is a need to reduce the size of actuator systems whilst still ensuring the required output force from the actuators to drive loads. This is particularly the case in e.g. aircraft. Conventionally, in aircraft, the greater pressure required by actuators for heavier loads has been provided by increasing the aircraft supply pressure. This, however, adds to the overall weight of the aircraft and can also require larger pressure supply parts and increased plumbing between the pressure supply and the actuators arranged at various locations on the aircraft. The alternative solution has been to increase the size of the actuator components. Again, however, this adds to the weight and size of the overall system. Weight should, however, be minimised in aircraft. Also, with the trend towards, e.g. thin-wing aircraft, it becomes difficult to place larger actuators on the wings.

The trend towards more electric aircraft, MEA, also means that the aircraft supply pressures can be smaller.

The solution provided by the present disclosure is to locally increase the supply pressure to the actuator when required using a compact assembly of a mode select valve and a motor pump assembly.

In a conventional actuator assembly (not shown separately, and not described in detail) the actuator 1 comprises a housing or cylinder 10 within which is mounted an axially moveable rod or piston 11 having a piston head 12 extending across the interior 13 of the housing 10. The piston head 12 separates the interior of the housing into an extension chamber 14 on one side of the head and a retraction chamber 15 on the other side of the head. The end 16 of the piston 11 furthest from the head extends from the housing and is arranged to be coupled to the load (not shown) to be moved. Pressure ports 17, 18 are provided in the housing to receive pressurised fluid to, respectively, the extension chamber 14 and the retraction chamber 15, as required to move the load. Depending on the balance of pressure between the extension chamber and the retraction chamber, the piston will either extend relative to the housing (arrow A) or retract into the housing (arrow B), causing corresponding movement of the load.

Pressurised fluid is provided to the actuator chambers, according to the desired direction of movement of the load, from a pressure source (not shown) through an electrohydraulic servovalve (EHSV) (not shown) and then via an EHSV mode valve 20. Pressurised fluid is provided from the EHSV to the EHSV mode valve via supply ports 21,22. A spool body 23 of the EHSV mode valve moves relative to the supply ports 21,22, according to a control command indicative of the desired load movement, to create flow channels from the supply ports through the EHSV (not shown) and the EHSV mode valve 20 by aligning openings in the spool body with the supply ports and control or return ports 24,25 as desired. The control and return ports are, conventionally, connected by fluid lines 26,27 to the extension and retraction chambers of the actuators. Depending on the alignment of the ports and openings, more or less pressure will be provided to the extension chamber compared to the retraction chamber, thus causing movement of the piston and, therefore, of the load. If, for example, the load is to be moved by the piston moving in direction A, the spool body 23 will be controlled to create a flow passage from supply port 21 to control port 24, the pressurised fluid is then provided via line 26 and port 17 to the extension chamber 14 of the actuator 10. The pressure in this chamber will exceed that in the retraction chamber 15, causing the piston to move in direction A. To move the piston in direction B, ports 22, 25 and 18 are aligned to reverse the balance of pressure. This works well for relatively low pressure loads, where the supply pressure is sufficient to provide the required output from the actuator. For higher output requirements, however, the supply pressure would need to be greatly increased for the same design of actuator. As discussed above, this is not always feasible.

The solution provided by the present disclosure is to provide an assembly between the EHSV mode valve 20 and the actuator 10 that can boost the actuator input pressure for higher output requirements. The assembly comprises an intermediate mode valve 30 and a gear motor assembly 40 as will be described in more detail below.

In the normal operating mode, for low pressures below a predetermined activation pressure, as shown in FIG. 1, this assembly will be transparent—i.e. the actuator system will operate as if it were not there and will, therefore, operate as described above for conventional systems. Fluid from the EHSV and EHSV mode valve 20 will pass directly through passages in the intermediate mode valve 30 to the actuator. A benefit of this is that oil flow is not affected by the system, so large flow rate can be achieved and actuator maximum speed rate is not affected.

In more detail, with reference to FIG. 1, for the example described above, in the normal operating mode, when the load is to be moved by the piston moving in direction A, the spool body 23 will be controlled to create a flow passage from supply port 21 to control port 24, the pressurised fluid is then provided via line 26 to a first end 31 of the intermediate mode valve 30, through a flow channel 32 and out through an outlet port 33 connected by line 34 to port 17 of the actuator and to the extension chamber 14 of the actuator 10. The pressure in this chamber will, as before, exceed that in the retraction chamber 15, causing the piston to move in direction A. To move the piston in direction B, ports 22, 25 and 18 are aligned via second end 35 of the intermediate mode valve 30, channel 36 and port 37 to reverse the balance of pressure. It can be seen, therefore, that the supply pressure (here 100-2500 psi as an example) passes through the EHSV mode valve 20 and the intermediate mode valve 30 to the actuator essentially unchanged (there may be some small pressure losses in the system but this is not substantial). This mode of operation works well for high speeds and low to moderate loads.

In some situations, the actuator 10 is required to provide a higher output. It may be that the supply pressure (not shown) can be increased somewhat, but not enough to achieve the output requirement using the conventional assembly described above. For example, an output of, say, over 5000 psi may be required but the maximum supply pressure is, say, only 3000 psi (20684.3 kPa) In such situations, the assembly of the present disclosure kicks in to boost the supply pressure to provide the required output. The assembly is configured, as mentioned above, to be transparent for lower pressures and to only kick in for pressures above a predetermined activation pressure. This will be described in relation to FIG. 2, where, in the example, the activation pressure is, say 2500 psi (17236.9 kPa). The elements shown in FIG. 2 are the same as shown in FIG. 1 and the same reference numerals will be used.

Figure 2:
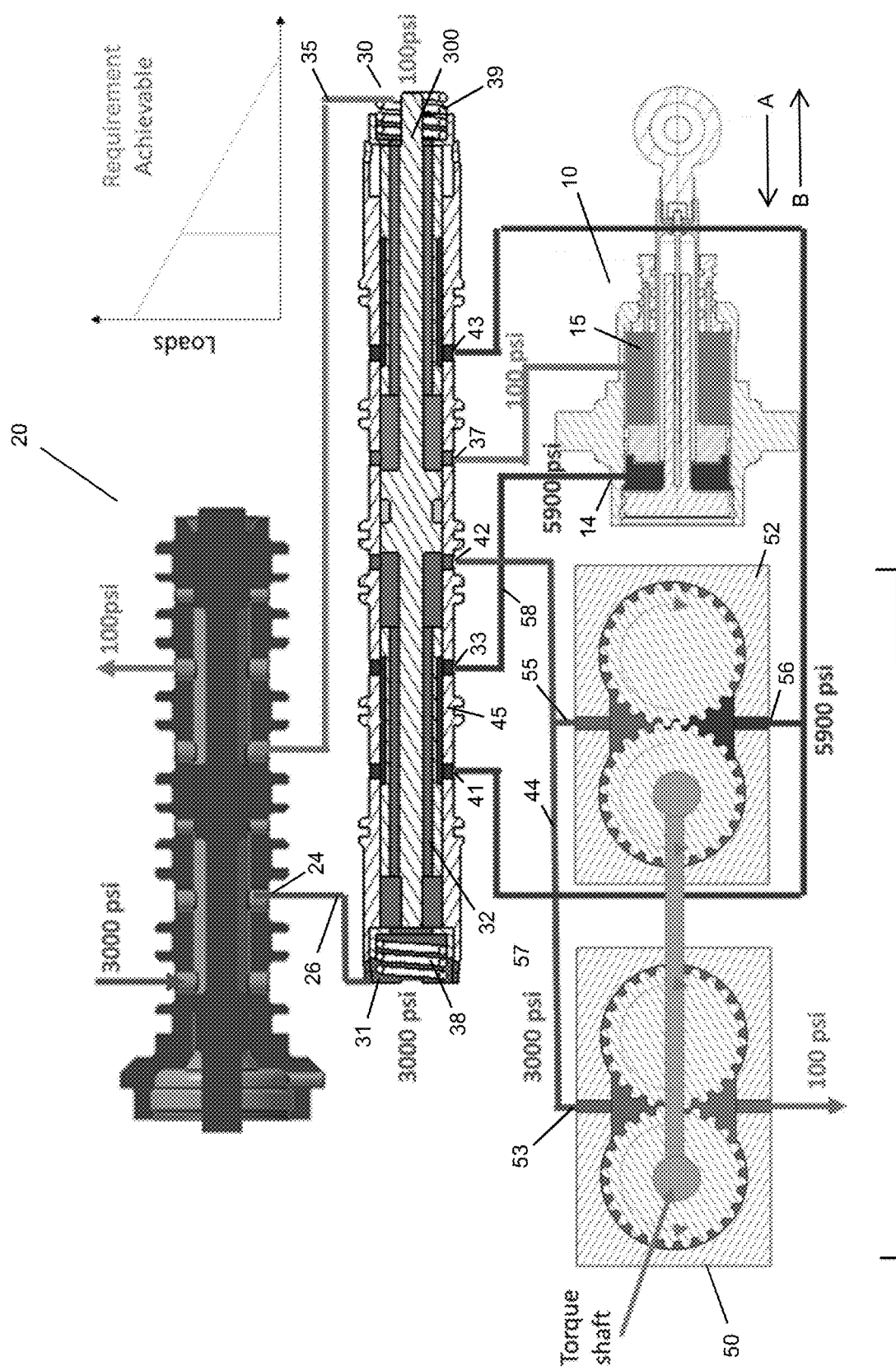
FIG. 2 is a schematic view of an assembly according to the present disclosure in an overpressurising operating mode.

Assume, as an example, the pressure required by the actuator 10 is 5900 psi (40679 kPa) but the maximum supply pressure is 3000 psi (20684.3 kPa) as shown in FIG. 2. As the supply pressure exceeds the activation threshold e.g. exceeds the 2500 psi (17236.9 kPa) of the normal operating mode described in relation to FIG. 1, the pressure (now, in this example 3000 psi (20684.3 kPa)) from the EHSV mode valve at port 24, provided to the first end 31 of the intermediate mode valve 30 via line 26 will be sufficient to overcome the forces of the springs 38,39 at the ends of the intermediate mode valve that, in the normal operating mode, hold the valve in the position wherein the channels 32 and 36 are aligned with ports 33 and 37 so creating a direct passage through the intermediate valve. The springs 38, 39 are selected such that as the pressure at the first end 31 exceeds the activation pressure, the spring 39 at the second end 35 compresses causing the spool 300 of the intermediate mode vale 30 to move towards the second end i.e., in this example, direction A. This causes channel 32 to align with output port 42 which was previously, in the normal mode, blocked, and causes port 33, previously aligned with channel 32, to be connected, via a closed loop channel 45 inside the spool 300, to a further outlet port 41, that was previously blocked. Output port 42 is connected via a high pressure line 44 to the gear motor assembly 40, described further below, rather than directly to the actuator 10.

The high pressure applied to the first end 31 of the intermediate mode valve 30 therefore passes through channel 32 to line 44 via output port 42, and to the gear motor assembly 40. The gear motor assembly 40 acts as a local pressure intensifier for the actuator as will now be described.

The gear motor assembly 40 includes a gear motor 50 connected via a torque shaft 51 to a gear pump 52. Input pressure to the gear motor 50 comes from line 44 via an inlet port 53. The other side of the gear motor 50 is connected to the low pressure return line 54 of the system. The pressure differential across the gear motor 51 causes the motor to rotate and generates a torque. This torque is transmitted, via the torque shaft 51, to the gear pump 52. The high pressure fluid from port 42 is also provided to an inlet port 55 of the gear pump 52. Operation of the gear pump 52 due to the transmitted torque increases the pressure of the fluid from port 55 and fluid at the increased pressure (here, as an example 5900 psi (40679 kPa)) is output at output port 56 of the gear pump 52. This increased pressure fluid flows along line 57 back to the intermediate mode valve 30 via port 41. It then passes through channel 45 and flows out of the intermediate valve 20 via port 33 through line 58 into the extension chamber 14 of the actuator 10.

The movement in direction A of the spool 300 of the intermediate valve 30, that caused the output port 42 to be connected to the gear motor assembly also caused port 37 to remain in fluid communication with the retraction chamber 15 via port 37.

Therefore, the intensified pressure applied to the extension chamber 14 greatly exceeds that in the retraction chamber 15 resulting in a high force movement of the actuator piston in direction A, sufficient to drive the high load.

In the transition from normal operating mode to overpressurising mode, the overlap of the intermediate mode valve's ports is selected such that when the pressure threshold is reached, port 42 is connected to port 31 before port 33 is connected to port 41. By doing this, the motor pump device starts to operate before it is actually connected to the actuator, thus making the transition smoother.

To retract the piston, the assembly works in the opposite direction in a symmetrical and analogous manner.

In the overpressurising mode, when changing from extension to retraction, when the direction is changed by the EHSV, port 31 is connected to the return port and port 35 to the high pressure port. Thus, the pressure at ports 31 and 42 quickly decreases and gear pump 52 starts to turn in the opposite direction, thus pumping hydraulic fluid from the extension chamber to the return port. The return line 54 should be connected to the return port of the EHSV (not shown) to avoid hydraulic fluid being pumped into aircraft return lines. Also, port 35 is still connected to port 37 so that when the direction changes from extension to retraction, the actuator can quickly start to move in the opposite direction without any time lag.

The sizes of the springs are selected to define the pressure threshold, and the gear motor pitch diameter are selected according to the desired maximum operating speeds and pressures.

Because the pressure intensifying features only come into operation at high loads, the components do not need to be designed to operate a high speeds and so smaller, simpler motors can be used for this part of the assembly.

The assembly only uses a single hydraulic circuit and so the risks of leakage and other hazards associated with hydraulic circuits are minimised. The assembly changes between modes autonomously, without any need for manual or controlled switching and without the need for any additional power source.

The assembly for intensifying the pressure—i.e. the intermediate mode valve and the gear motor assembly, can be configured in a compact assembly that can be positioned in locations where there is not much space e.g. on or near an aircraft wing. The assembly can be fitted to the actuator mounting manifold or spaced from the manifold. The compact arrangement therefore allows some freedom in design and location of the overall system.

Whilst the assembly has been described in the context of an aircraft actuator, it will also find application in other fields where hydraulic actuators are used and where supply power needs to be boosted or intensified for increased output without increasing the size of the actuator.

The invention claimed is:

1. An actuator pressure intensifying assembly comprising:
a gear motor assembly;
a mode valve arranged to receive, at an input port, a supply pressure and to provide, at an output port, a control pressure to an actuator;
the mode valve further configured to move, in response to the supply pressure exceeding a predetermined activation threshold, from a first mode in which the supply pressure flows directly from the input port to the output port in a first fluid flow path, and a second mode in which the supply pressure flows from the input port to the output port in a second fluid flow path which includes the gear motor assembly between the input port and the output port which intensifies the supply pressure such that the control pressure is higher than the supply pressure;
wherein the mode valve comprises:
a valve body, wherein the valve body defines the input port and the output port and further defines one or more second mode outlet ports;
a spool arranged for axial movement within the valve body;
wherein the mode valve is arranged such that in the first mode, the spool is arranged to provide a flow path between the input port and the output port and to block the second mode output ports, and in the second mode, to provide a flow path from the input port to a at least one of the one or more second mode outlet ports connected to the gear motor assembly and to block the output port; and
a spring at each end of the spool, the springs selected such that in the first mode, the spool body is positioned, by the springs, to create the flow path between the input port and the output port, and when a pressure applied at the input port exceeds a threshold pressure, the spool body is moved against the force of the springs to create the flow path from the input port to the at least one of the one or more second mode outlet ports.

2. The assembly of claim 1, wherein the gear motor assembly comprises:
a gear motor; and
a gear pump connected to the gear motor via a torque shaft;
wherein the gear motor and the gear pump are arranged such that in the second mode, the supply pressure flows through the mode valve to the gear motor to cause the motor to rotate, and wherein torque from rotation of the motor is transmitted to the gear pump to provide increased pressure that is returned to the mode valve and provided to the actuator.

3. The assembly of claim 1, wherein the mode valve is arranged to change from the first mode to the second mode in response to the supply pressure exceeding a predetermined threshold pressure.

4. The assembly of claim 3, wherein the threshold pressure is 2500 psi (17236.9 kPa).

5. An actuator assembly comprising:
   an electrohydraulic servovalve (EHSV), to provide a supply pressure;
   an actuator to receive a control pressure; and
   an actuator pressure intensifying assembly as claimed in claim 1, located between the EHSV and the actuator.

6. The assembly of claim 5, further comprising an EHSV mode valve located between the EHSV and the mode valve.

7. The assembly of claim 5, arranged to be connected to a moveable part of an aircraft.

\* \* \* \* \*